(12) United States Patent
Tewari (10) Patent No.: US 11,023,479 B2
(45) Date of Patent: Jun. 1, 2021

(54) MANAGING ASYNCHRONOUS ANALYTICS OPERATION BASED ON COMMUNICATION EXCHANGE

(71) Applicant: MICROSOFT TECHNOLOGY LICENSING, LLC, Redmond, WA (US)

(72) Inventor: Ashutosh Tewari, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1072 days.

(21) Appl. No.: 15/497,233

(22) Filed: Apr. 26, 2017

(65) Prior Publication Data
US 2018/0314741 A1 Nov. 1, 2018

(51) Int. Cl.
*G06F 16/248* (2019.01)
*H04L 12/58* (2006.01)
*G06F 16/951* (2019.01)
*G06F 16/25* (2019.01)
*G06F 16/903* (2019.01)

(52) U.S. Cl.
CPC .......... *G06F 16/248* (2019.01); *G06F 16/252* (2019.01); *G06F 16/90335* (2019.01); *G06F 16/951* (2019.01); *H04L 51/046* (2013.01); *H04L 51/066* (2013.01)

(58) Field of Classification Search
CPC ............. G06F 16/248; G06F 16/90335; G06F 16/951; G06F 16/252
USPC ........................................................ 707/722
See application file for complete search history.

(56) References Cited

U.S. PATENT DOCUMENTS

| 5,826,269 A * | 10/1998 | Hussey ................. G06Q 10/107 |
| 2004/0039742 A1* | 2/2004 | Barsness ............... G06F 16/252 |
| 2009/0204507 A1* | 8/2009 | Cockayne .............. G06Q 20/10 705/26.1 |

(Continued)

FOREIGN PATENT DOCUMENTS

WO 0190909 A1 11/2001

OTHER PUBLICATIONS

Mittal, et al., "Automatic Email Response System in E-learning", In Proceedings of International Conference on Advances in Information Communication Technology & Computing, Aug. 12, 2016, 5 pages.

(Continued)

*Primary Examiner* — Mark E Hershley
(74) *Attorney, Agent, or Firm* — Michael Best & Friedrich LLP (57) ABSTRACT

Variety of approaches to manage an asynchronous analytics operation based on a communication exchange are described. A communication service initiates operation(s) to manage an asynchronous analytics operation upon receiving a request communication to start the asynchronous analytics operation. The request communication is detected as an intent to start the asynchronous analytics operation based on of a sender identification, a destination address, a subject, and/or a content of the request communication. The request communication is parsed to identify an analytics query associated with the asynchronous analytics operation. Next, the analytics query is executed. Upon receiving a result for the analytics query, the result is transmitted in a reply communication.

16 Claims, 7 Drawing Sheets

(56) References Cited

U.S. PATENT DOCUMENTS

| | | | | |
|---|---|---|---|---|
| 2010/0030798 | A1* | 2/2010 | Kumar | G06F 16/954 |
| | | | | 707/737 |
| 2010/0070448 | A1* | 3/2010 | Omoigui | H01L 27/14647 |
| | | | | 706/47 |
| 2010/0223629 | A1* | 9/2010 | Appelbaum | G06F 8/20 |
| | | | | 719/318 |
| 2011/0161431 | A1* | 6/2011 | Jagannathan | H04L 51/04 |
| | | | | 709/206 |
| 2012/0245925 | A1* | 9/2012 | Guha | G06F 40/20 |
| | | | | 704/9 |
| 2014/0358585 | A1* | 12/2014 | Reiner | G16H 80/00 |
| | | | | 705/3 |
| 2015/0063556 | A1 | 3/2015 | Uba et al. | |
| 2015/0095841 | A1* | 4/2015 | Fiedler | G06F 16/2423 |
| | | | | 715/781 |
| 2015/0142727 | A1* | 5/2015 | Louie | G06F 16/248 |
| | | | | 707/603 |
| 2015/0222656 | A1* | 8/2015 | Haugsnes | H04L 63/1441 |
| | | | | 726/23 |
| 2015/0229517 | A1* | 8/2015 | Kammerer | H04L 41/0803 |
| | | | | 709/217 |
| 2015/0347480 | A1* | 12/2015 | Smart | G06F 16/2237 |
| | | | | 707/743 |
| 2016/0012465 | A1* | 1/2016 | Sharp | G06Q 20/386 |
| | | | | 705/14.17 |
| 2017/0041296 | A1* | 2/2017 | Ford | G06F 16/951 |
| 2017/0053357 | A1* | 2/2017 | Bowman | G06F 16/2471 |
| 2017/0078922 | A1* | 3/2017 | Raleigh | H04W 28/10 |
| 2017/0102694 | A1* | 4/2017 | Enver | G05B 19/41875 |
| 2018/0314741 | A1* | 11/2018 | Tewari | G06F 16/951 |
| 2018/0329993 | A1* | 11/2018 | Bedadala | G06F 40/58 |
| 2018/0336246 | A1* | 11/2018 | Dasam | G06F 16/2453 |

OTHER PUBLICATIONS

"Asynchronous Processing in Force com", https://developer.salesforce.com/page/Asynchronous_Processing_in_Force_com, Published on: Feb. 2015, 5 pages.

"Email Interfaces to Chatbots", https://www.chatbots.org/ai_zone/viewthread/1512/, Published on: Oct. 2013, 9 pages.

"International Search Report and Written Opinion Issued in PCT Application No. PCT/US18/026623", dated Jul 11, 2018, 13 Pages.

* cited by examiner

MANAGING ASYNCHRONOUS ANALYTICS OPERATION BASED ON COMMUNICATION EXCHANGE

BACKGROUND

Information exchange have changed processes associated work and personal environments. Automation and improvements in processes have expanded scope of capabilities offered for personal and business data consumption. With the development of faster and smaller electronics, execution of mass processes at cloud systems have become feasible. Indeed, applications provided by data centers, data warehouses, data workstations have become common features in modern personal and work environments. Communication service(s) provide a wide variety of applications ranging from communication(s) and analytics associated with the communication(s).

Increasingly, cloud based resources are utilized for variety of services that include communication services, and/or analytics services among others that facilitate metrics analysis associated with assets such as tangible and personnel. However, there are currently substantial gaps in managing an asynchronous analytics operation. Personnel resources are unnecessarily consumed for initiating, monitoring, troubleshooting, and/or analyzing result(s) associated with analytics operation(s). Lack of relevant management solutions to manage analytics operation(s) cause poor management of personnel resources and time when attempting to manage an asynchronous analytics operation.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a management of an asynchronous analytics operation based on a communication exchange. A communication service, according to embodiments, may initiate operations to manage the asynchronous analytics operation upon receiving a request communication to start an asynchronous analytics operation. The request communication may be detected as an intent to start the asynchronous analytics operation based on a sender identification, a destination address, a subject, and/or a content of the request communication. The request communication may be parsed to identify an analytics query associated with the asynchronous analytics operation. An access authorization associated with the analytics query may be verified. The access authorization may grant a permission to execute the analytics query. Next, the analytics query may be executed. Furthermore, a result for the analytics query may be received. The result may be transmitted in a reply communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a communication service may manage an asynchronous analytics operation based on a communication exchange. In an example scenario, the communication service may receive a request communication to start the asynchronous analytics operation. The request communication may be detected as an intent to start the asynchronous analytics operation based on a sender identification, a destination address, a subject, and/or a content of the request communication. An example of a request communication may include an email that is generated to relay a request for the asynchronous analytics operation. The asynchronous analytics operation may include an analytics query to be executed on a dataset. The asynchronous analytics operation may also include a request to execute the analytics query within a time period. Furthermore, the asynchronous analytics operation may allow for completion of the analytics query in a time period that is not associated with arrival of the request communication. As such, the analytics query may be completed subsequent to the arrival of the request communication, at a later time period, and/or at a designated time period associated with the asynchronous analytics operation.

The communication service may next parse the request communication to identify the analytics query associated with the asynchronous analytics operation. The analytics query may be formatted in a standardized query language. The communication service may identify the analytics query within a body of the request communication. An access authorization associated with the analytics query may also be verified. The access authorization may grant a permission to execute the analytics query. Alternatively, if the analytics query is determined to not have the access authorization than the analytics query may be rejected (for an execution). Furthermore, if the analytics query is determined to include invalid syntax, the analytics query may be rejected (for an execution). A notification may be transmitted back to a sender of the request communication. The notification may include a description of the rejection and a reason for the rejection (such as an invalid syntax or a failure to have the access authorization).

Next, the analytics query may be executed. The analytics query may be executed by an analytics module (or an analytics provider) to query a dataset. The dataset may be an internal dataset or may be provided by the analytics provider and/or a data provider. Furthermore, a result for the analytics query may be received. The result may include data record(s) that match the analytics query. Alternatively, the result may include a failure to locate a data record that matches the analytics query. The result may be transmitted in a reply communication. The reply communication may include a reply email.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for managing an asynchronous analytics operation based on a communication exchange. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
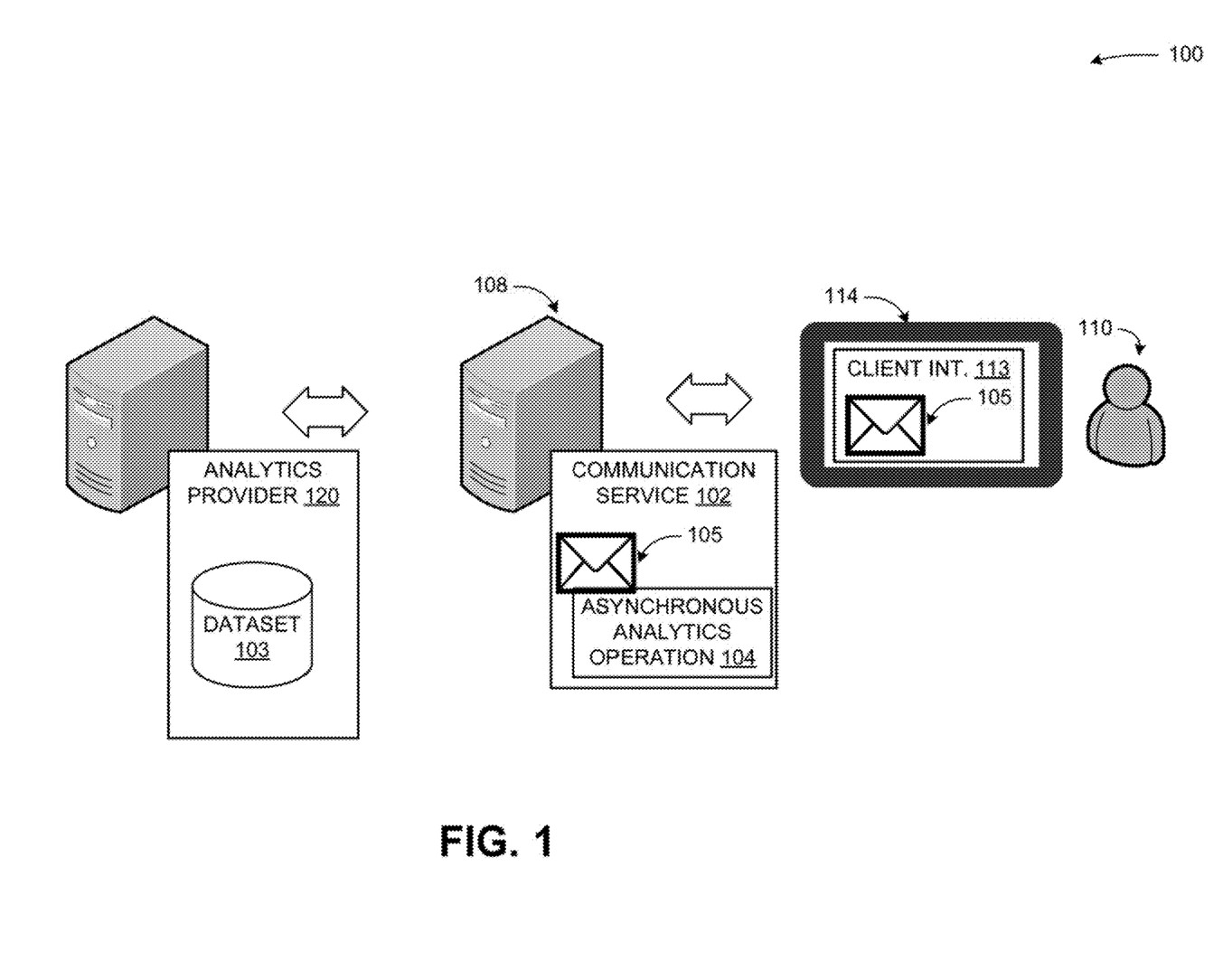
FIG. 1 is a conceptual diagram illustrating examples of managing an asynchronous analytics operation based on a communication exchange, according to embodiments.

FIG. 1 is a conceptual diagram illustrating examples of managing an asynchronous analytics operation based on a communication exchange, according to embodiments.

In a diagram 100, a server 108 may execute (or provide) a communication service 102. The server 108 may include a physical server providing service(s), application(s), and/or an interface to client devices. A service (such as the communication service 102) may include an application performing operations in relation to a client application and/or a subscriber, among others. The server 108 may include and/or is part of a workstation, a data warehouse, a data center, and/or a cloud based distributed computing source, among others.

The server 108 may execute the communication service 102. The communication service 102 may receive a request communication 105 to start an asynchronous analytics operation 104 from a sender 110. The request communication 105 may be detected as an intent to start the asynchronous analytics operation 104 based on a sender identification, a destination address, a subject, and/or a content of the request communication 105. The sender 110 may include an administrator, a manager, a tenant, and/or a tenant administrator of the communication service 102. The sender 110 may manage a number of accounts and/or applications, among other assets associated with users of the communication service 102. The sender 110 may have an access authorization to perform the asynchronous analytics operation 104. The access authorization may include a permission to perform a read operation, write operation, and/or an execution operation associated with the asynchronous analytics operation 104 in relation to a dataset 103 associated with the asynchronous analytics operation 104.

An example of the request communication 105 may include an email that is generated to relay a request for the asynchronous analytics operation 104. The asynchronous analytics operation 104 may include an analytics query to be executed on the dataset 103. An example of a dataset may include a number of mailboxes associated with the users. The sender 110 may be authorized to access the mailboxes. The access authorization may allow the sender 110 to process the mailboxes with the analytics query as part of the asynchronous analytics operation 104.

The asynchronous analytics operation 104 may also include a request for a time period in which the analytics query may be completed. The asynchronous analytics operation 104 may allow for a completion of the analytics query in a time period that is not associated with arrival of the request communication 105. As such, the analytics query may be completed subsequent to the arrival of the request communication 105, at a later time period, and/or any designated time period associated with the asynchronous analytics operation 104.

The communication service 102 may next parse the request communication to identify the analytics query associated with the asynchronous analytics operation. The analytics query may be formatted in a standardized query language. The communication service may identify the analytics query within a body of the request communication 105. Furthermore, an access authorization associated with the analytics query may be verified. The access authorization may grant a permission to execute the analytics query.

Next, the analytics query may be executed. The analytics query may be executed by an analytics module of the communication service 102 or by an analytics provider 120 to query the dataset 103. The analytics provider 120 may include an internal and/or an external resource that is customized to execute the analytics query and other(s) to query the dataset 103 and/or other dataset(s). The dataset 103 may be an internal dataset or may be provided by the analytics provider 120 and/or an external/internal data provider. Furthermore, a result for the analytics query may be received. The result may include data record(s) that match the analytics query. Alternatively, the result may include a failure to locate a data record that matches the analytics query. The result may be transmitted in a reply communication. The reply communication may include a reply email.

Furthermore, the communication service 102 may provide a client interface 113 rendered by a client device 114 to the sender 110. The sender 110 may initiate the asynchronous analytics operation 104 by generating the request communication 105 using the client interface 113. Alternatively, the communication service 102 may manage the asynchronous analytics operation 104 through a client interface rendered by an application (such as a communication and/or productivity application) executed by the client device 114.

The server 108 may communicate with the client device 114, and/or the analytics provider 120, through a network. The network may provide wired or wireless communications between network nodes such as the client device 114, the server 108, and/or the analytics provider 120, among others. Previous example(s) to manage an asynchronous analytics operation are not provided in a limiting sense. Alternatively, the communication service 102 may manage the asynchronous analytics operation as a desktop application, a workstation application, and/or a server application, among others. The client interface 113 may also include a client application interacting with the communication service 102.

The sender 110 may interact with the client interface 113 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the communication service 102, embodiments are not limited to these components or system configurations and can be implemented with other system configuration employing fewer or additional components.

Figure 2:
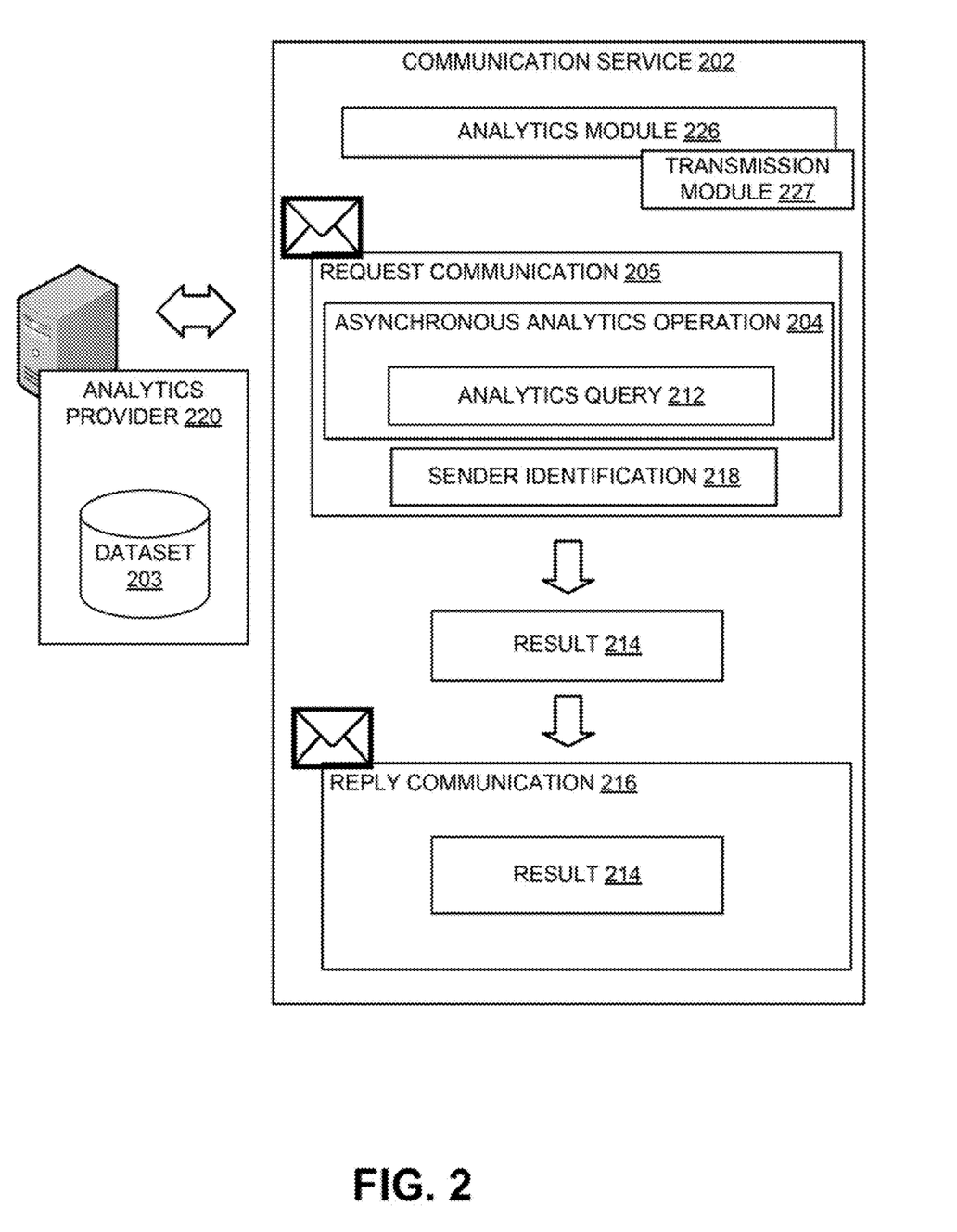
FIG. 2 is a display diagram illustrating example components of a communication service that manages an asynchronous analytics operation based on a communication exchange, according to embodiments.

FIG. 2 is a display diagram illustrating example components of a communication service that manages an asynchronous analytics operation based on a communication exchange, according to embodiments.

As illustrated in diagram 200, an analytics module 226 of a communication service 202 may receive a request communication 205 to start an asynchronous analytics operation 204. The request communication 205 is detected as an intent to start the asynchronous analytics operation 204 based on a sender identification 218, a destination address, a subject, and/or a content of the request communication 205. In an example scenario, the asynchronous analytics operation 204 may include action(s) to query a dataset 203. Data analysis action(s) may also be executed as part of the asynchronous analytics operation 204. The asynchronous analytics operation 204 may be performed in a time period that is not associated with an arrival time of the request communication 205. As such, upon receiving a request for the asynchronous analytics operation 204, actions associated with the asynchronous analytics operation 204 may be started in a time period as defined in the request communication 205. Alternatively, the actions may be performed based on a resource availability associated with an analytics provider 220 (that may perform the actions) or based on demand.

An example of a request communication 205 may include a request email. The request email may be a custom generated email that describes the asynchronous analytics operation 204. For example, the request communication 205 may include an analytics query 212 within a body of the request communication 205. The body of the request communication 205 may be processed to extract the analytics query 212. The analytics query 212 may include instruction(s) that are provided by a sender of the request communication 205 to query a dataset 203 and to perform additional analysis on located data record(s).

The asynchronous analytics operation 204 may further be identified based on a sender identification 218. The sender identification 218 may be processed to determine the request communication 205 as including the asynchronous analytics operation 204. The sender identification 218 may be verified as an authorized user (such as an administrator, a manager, and/or a tenant administrator, among others) consuming functionality provided by the communication service 202. For example, the sender identification 218 may identify an administrator of mailboxes associated with user(s) of communication service 202. The mailboxes may constitute the dataset 203 which the administrator may be authorized to query with the analytics query 212. As such, the sender identification may be identified as authorized to query the dataset 203 with the analytics query 212 and perform the asynchronous analytics operation 204.

In an example scenario, the analytics query 212 may be provided to the analytics provider 220 that may host the dataset 203. Alternatively, the analytics provider 220 may perform the actions associated with the analytics query 212 by accessing the dataset 203 through a data provider that hosts the dataset 203. The analytics provider 220 may query the dataset 203 with the analytics query 212. The analytics query 212 may include instructions formatted in a standardized query language. Alternatively, the analytics query 212 may include instructions formatted in a natural language. In such a scenario, the analytics module 226 (or the analytics provider 220) may translate the instructions to ones that are formatted in a standardized query language.

The analytics provider 220 may locate data record(s) that match the analytics query 212. Furthermore, the analytics provider 220 (or the analytics module 226) may perform analysis action(s) on the located data record(s) based on the instruction(s) in the analytics query 212. Upon a completion of the execution of the analytics query 212, a result 214 may be received from the analytics provider 220. The result 214 may include located data record(s) that match the analytics query 212 which may or may not be analyzed based on the instruction(s) in the analytics query 212. The result 214 may be inserted into a reply communication 216 and transmitted to the sender of the request communication 205 and/or other entity(s)/stake holder(s) as requested by the sender and/or based on a system configuration.

Figure 3:
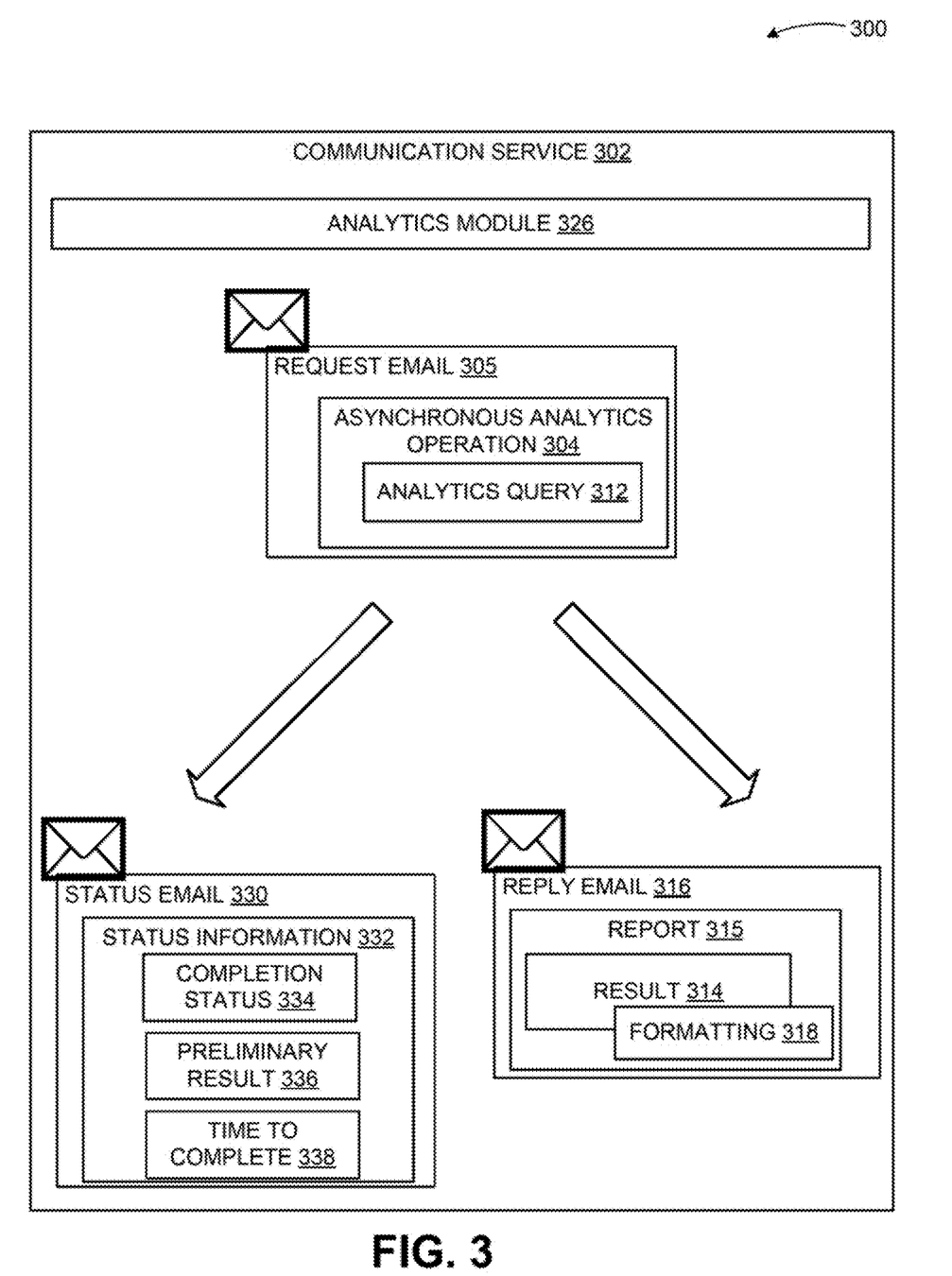
FIG. 3 is a display diagram illustrating components of a scheme to manage an asynchronous analytics operation based on a communication exchange, according to embodiments.

FIG. 3 is a display diagram illustrating components of a scheme to manage an asynchronous analytics operation based on a communication exchange, according to embodiments.

As shown in a diagram 300, an analytics module 326 of a communication service 302 may receive a request communication such as a request email 305. The request email 305 may be customized to include an asynchronous analytics operation 304. The request email 305 may be inferred to include the asynchronous analytics operation 304 based on a destination address associated with the request email 305.

An authorization of a sender of the request email 305 may also be verified to perform actions associated with the asynchronous analytics operation 304. The asynchronous analytics operation 304 may also be determined from an analytics query 312 that may be parsed from a body of the request email 305. The analytics query 312 may include instructions to query a dataset and/or perform an analysis on the located data record(s).

A status email 330 may be generated based on an event associated with the asynchronous analytics operation 304. For example, the asynchronous analytics operation 304 may include an instruction to report a status of the analytics query 312 based on a completion status 334, and/or based on a time period based event (from a start of an execution of the analytics query 312), among others. For example, the request email may include 305 may include an instruction to report a status information 332 associated with the analytics query 312 at a particular interval such as 25% completion, 50% completion, and/or 75% completion, among others. As such, in response to detecting events associated with an execution of the analytics query 312, the analytics module 326 may generate a status email 330 that includes the status information 332.

The status information 332 may include a completion status 334 associated with the execution of the analytics query 312. The status information 332 may also include preliminary result 336 that includes preliminary data record(s) that match the analytics query 312 upon a partial execution of the analytics query 312 on a dataset. The status information 332 may also include a time to complete 338 an execution of the analytics query 312. An analytics provider (or an analytics module) that executes the analytics query 312 may be inquired about metrics such as the completion status 334, preliminary result 336, and/or the time to complete 338, among others. The metrics may be estimated and/or retrieved by the analytics provider and/or the analytics module associated with the communication service 302 and provided as status information 332 within the status email 330. The status email 330 may be transmitted to a sender of the request email 305, other entity(s), and/or other stakeholder(s), among others associated with the asynchronous analytics operation 304.

The analytics module 326 may also generate a reply email 316 in response to receiving a result 314 in response to an execution of the analytics query 312. The result 314 may include data record(s) that match the analytics query 312 executed on a dataset. In an example scenario, the result 314 may be processed with a formatting 318 to generate a report 315. The formatting may include a historical format associated with a sender of the request email 305, a format template associated with the analytics query 312, and a data provider based formatting. The formatting 318 may be applied based on an instruction detected in the asynchronous analytics operation 304. Alternatively, the formatting 318 may be applied based on a system configuration associated with the communication service 302. The report 315 may be inserted into the reply email 316 and transmitted to the sender of the request email 305 and/or other stakeholders associated with the asynchronous analytics operation 304.

Figure 4:
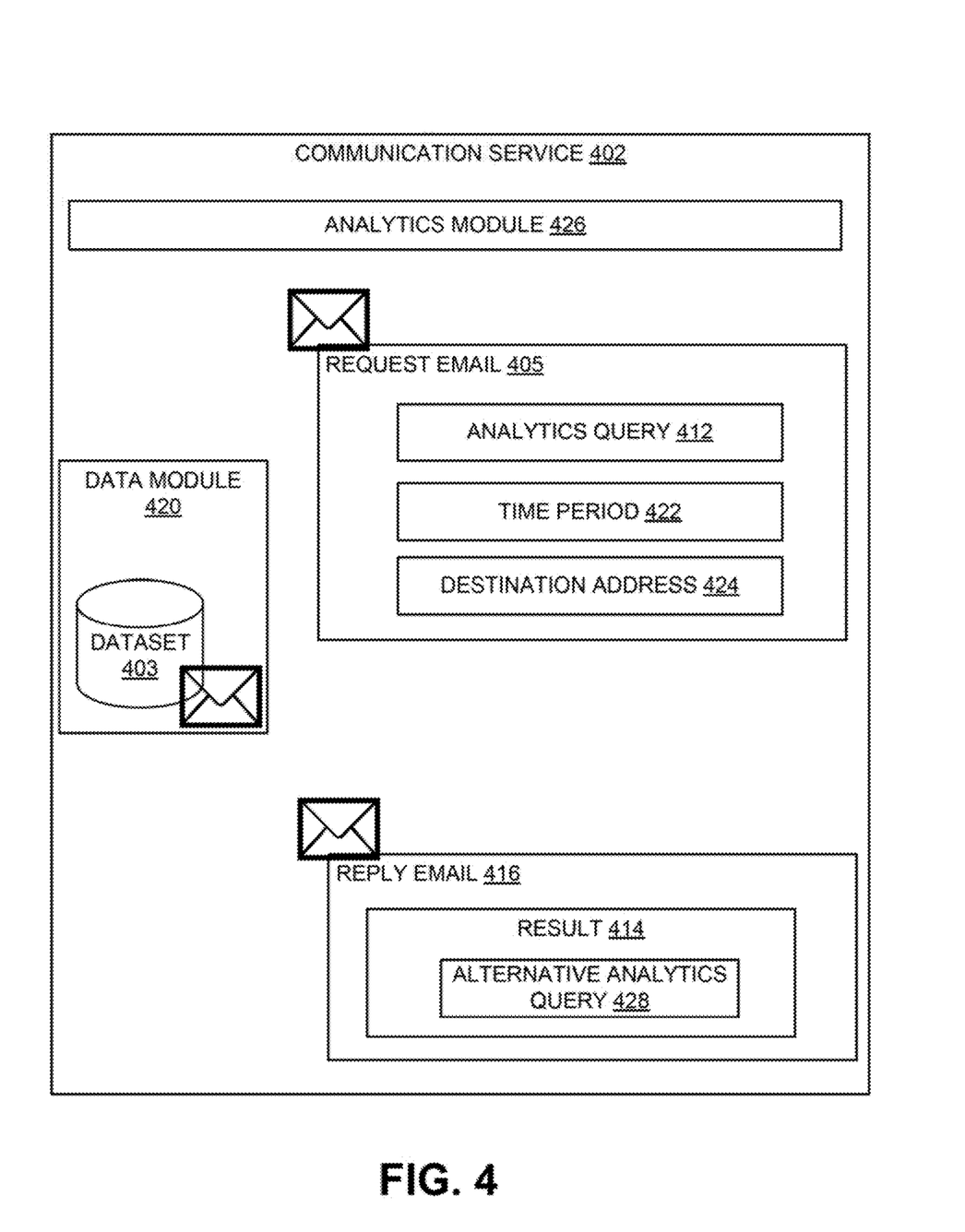
FIG. 4 is a display diagram illustrating another example of a scheme to manage an asynchronous analytics operation based on a communication exchange, according to embodiments.

FIG. 4 is a display diagram illustrating another example of a scheme to manage an asynchronous analytics operation based on a communication exchange, according to embodiments.

As shown in a diagram 400, an analytics module 426 of a communication service 402 may receive a request email 405. The request email 405 may be determined to include a request for an asynchronous analytics operation based on property(s) and content. For example, a body of the request email may be processed to identify an analytics query 412.

Furthermore, the request email 405 may be inferred to include an asynchronous analytics operation based on a destination address 424 of the request email 405. The destination address 424 of the request email 405 may be a designation associated with the analytics query 412 and other analytics query(s).

The request email 405 may also include a time period 422 to allow a sender of the request email 405 to specify a duration for an execution of the analytics query 412. Upon detecting the time period 422, the analytics module 426 (or an analytics provider) may prioritize the analytics query 412 for a completion within the time period. Furthermore, if an insufficient capacity is detected to complete the analytics query 412 then the analytics query 412 may be partitioned among other analytics provider(s). For example, the analytics module 426 may execute the analytics query 412 on a section of the dataset 403 managed by a data module 420. An analytics provider may be queried to execute the analytics query 412 on a remaining section of the dataset 403. A result of the analytics query 412 may be transmitted (to a sender of the request email 405 or other stakeholder) within a reply email 416.

In another example scenario, the analytics module 426 may detect a failure to locate data record(s) that match the analytics query 412. Since the analytics query 412 produced no result(s), the analytics module 426 may analyze the analytics query 412 and suggest an alternative analytics query 428 within a reply email 416. The alternative analytics query 428 may include an alternative set of instruction(s) that are related and/or similar to the instruction(s) in the analytics query 412. The alternative analytics query 428 may be generated based on a prediction scheme that evaluates the analytics query 412 and predicts other result that may be desired by a sender of the request email 405. The prediction scheme may utilize historical analytics query(s) and result(s) associated with the sender. The alternative analytics query 428 may also be tested against the dataset 403 to produce other result. A sample of the other result may also be transmitted along with the alternative analytics query 428.

As discussed above, the communication service may be employed to perform operations to manage an asynchronous analytics operation based on a communication exchange. An increased performance and efficiency improvement with the communication service 102 may occur as a result of executing an asynchronous analytics query and reporting a result within a communication such as an email. Additionally, automating a performance of the asynchronous analytics operation detached from an arrival time of the request, by the communication service 102, may reduce processor load, increase processing speed, conserve memory, and reduce network bandwidth usage.

Embodiments, as described herein, address a need that arises from a lack of efficiency to manage an asynchronous analytics operation based on a communication exchange. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Managing an asynchronous analytics operation based on a communication exchange may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
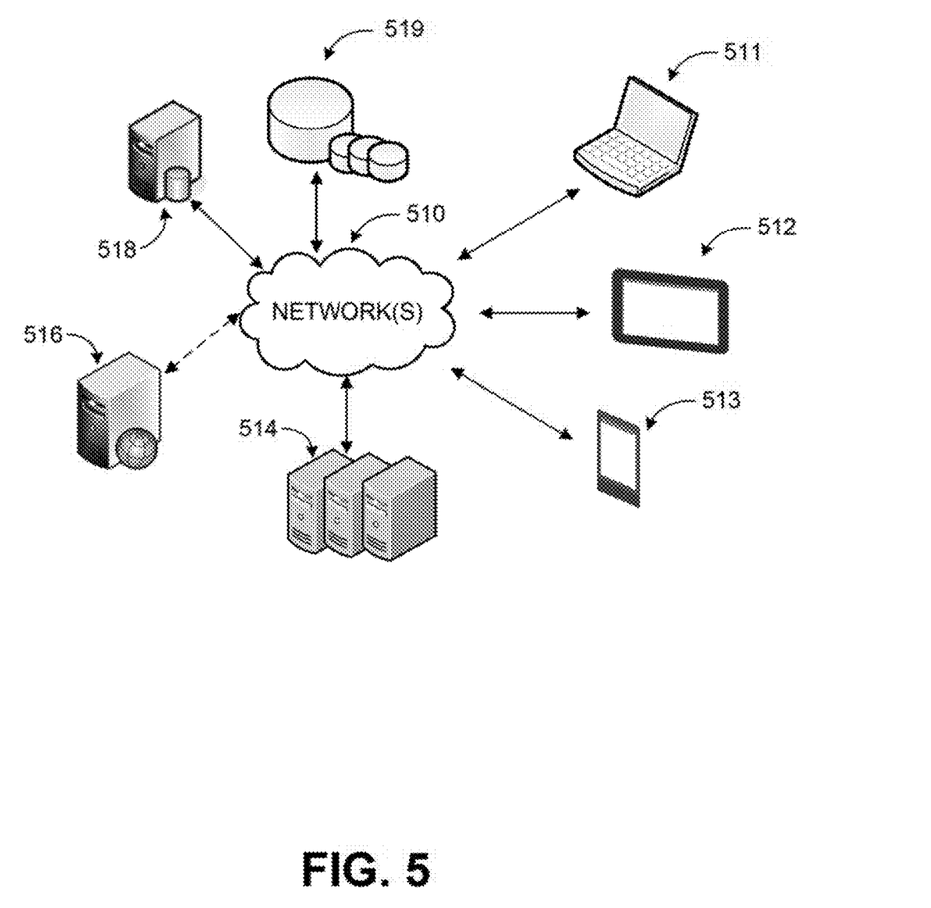
FIG. 5 is a simplified networked environment, where a system according to embodiments may be implemented.

FIG. 5 is an example networked environment, where embodiments may be implemented. A communication service configured to manage an asynchronous analytics operation may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication service may receive a request communication to start an asynchronous analytics operation. The request communication may be detected as an intent to start the asynchronous analytics operation based on a sender identification, a destination address, a subject, and/or a content of the request communication. The request communication may be parsed to identify an analytics query associated with the asynchronous analytics operation. An access authorization associated with the analytics query may be verified. The access authorization may grant a permission to execute the analytics query. Next, the analytics query may be executed. Furthermore, a result for the analytics query may be received. The result may be transmitted in a reply communication. The communication service may store data associated with the asynchronous analytics operation in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to manage an asynchronous analytics operation based on a communication exchange. Furthermore, the networked environments discussed in FIG. 5 are for illustration purposes only. Embodiments are not limited to the example applications, modules, or processes.

Figure 6:
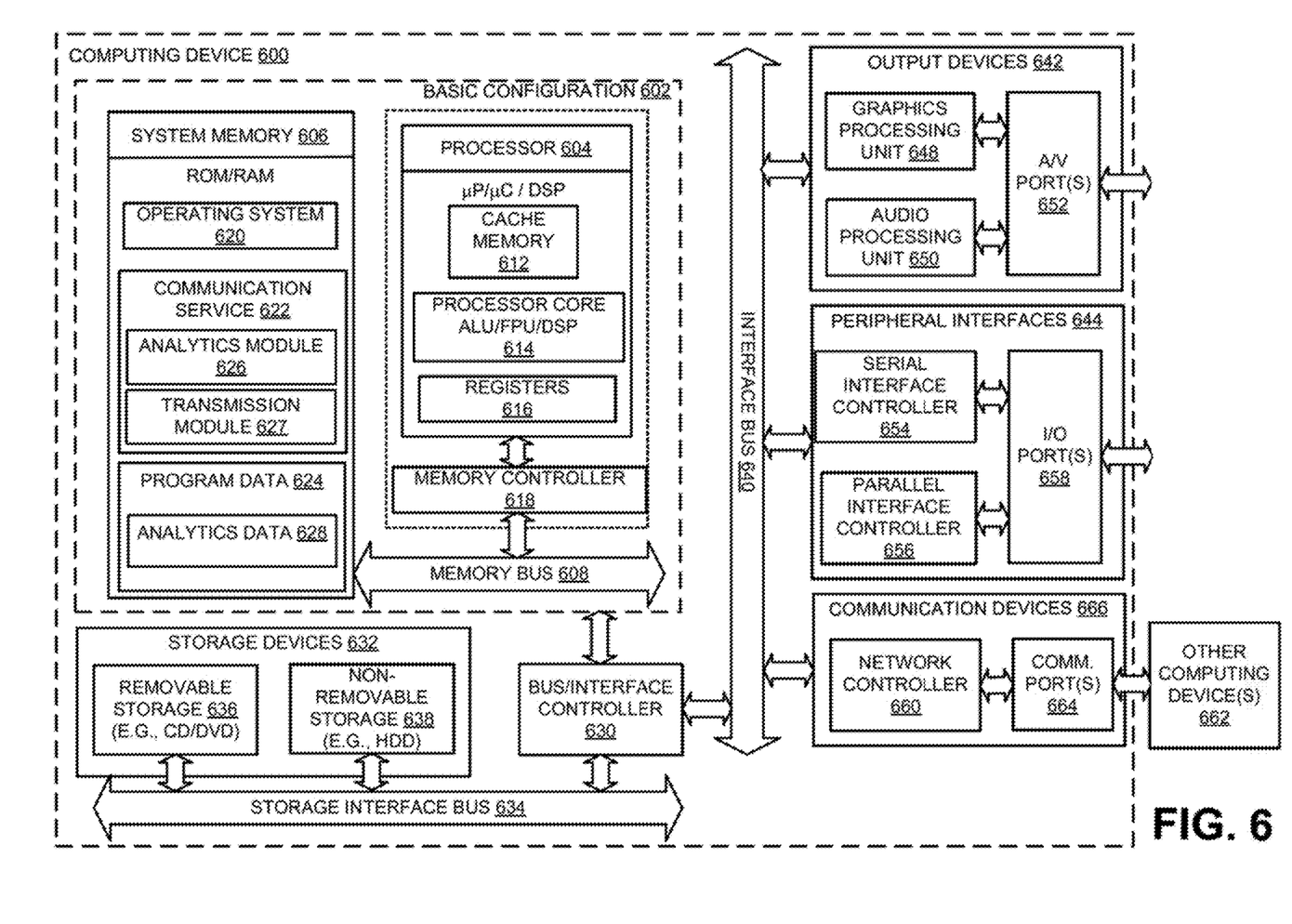
FIG. 6 is a block diagram of an example computing device, which may be used to manage an asynchronous analytics operation based on a communication exchange, according to embodiments.

FIG. 6 is a block diagram of an example computing device, which may be used to manage an asynchronous analytics operation based on a communication exchange, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), a graphics processing unit (GPU), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication service 622, and a program data 624. The communication service 622 may include components such as an analytics module 626 and a transmission module 627. The analytics module 626 and the transmission module 627 may execute the processes associated with the communication service 622. The analytics module 626 may receive a request communication to start an asynchronous analytics operation. The request communication may be detected as an intent to start the asynchronous analytics operation based on a sender identification, a destination address, a subject, and/or a content of the request communication. The request communication may be parsed to identify an analytics query associated with the asynchronous analytics operation. An access authorization associated with the analytics query may be verified. The access authorization may grant a permission to execute the analytics query. Next, the analytics query may be executed. Furthermore, a result for the analytics query may be received. The transmission module 627 may transmit the result in a reply communication.

Input to and output out of the communication service 622 may be transmitted through a communication device 666 that may be communicatively coupled to the computing device 600. The communication device 666 may provide wired and/or wireless communication. The program data 624 may also include, among other data, an analytics data 628, or the like, as described herein. The analytics data 628 may include information associated with the asynchronous analytics operation, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to manage an asynchronous analytics operation based on a communication exchange. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
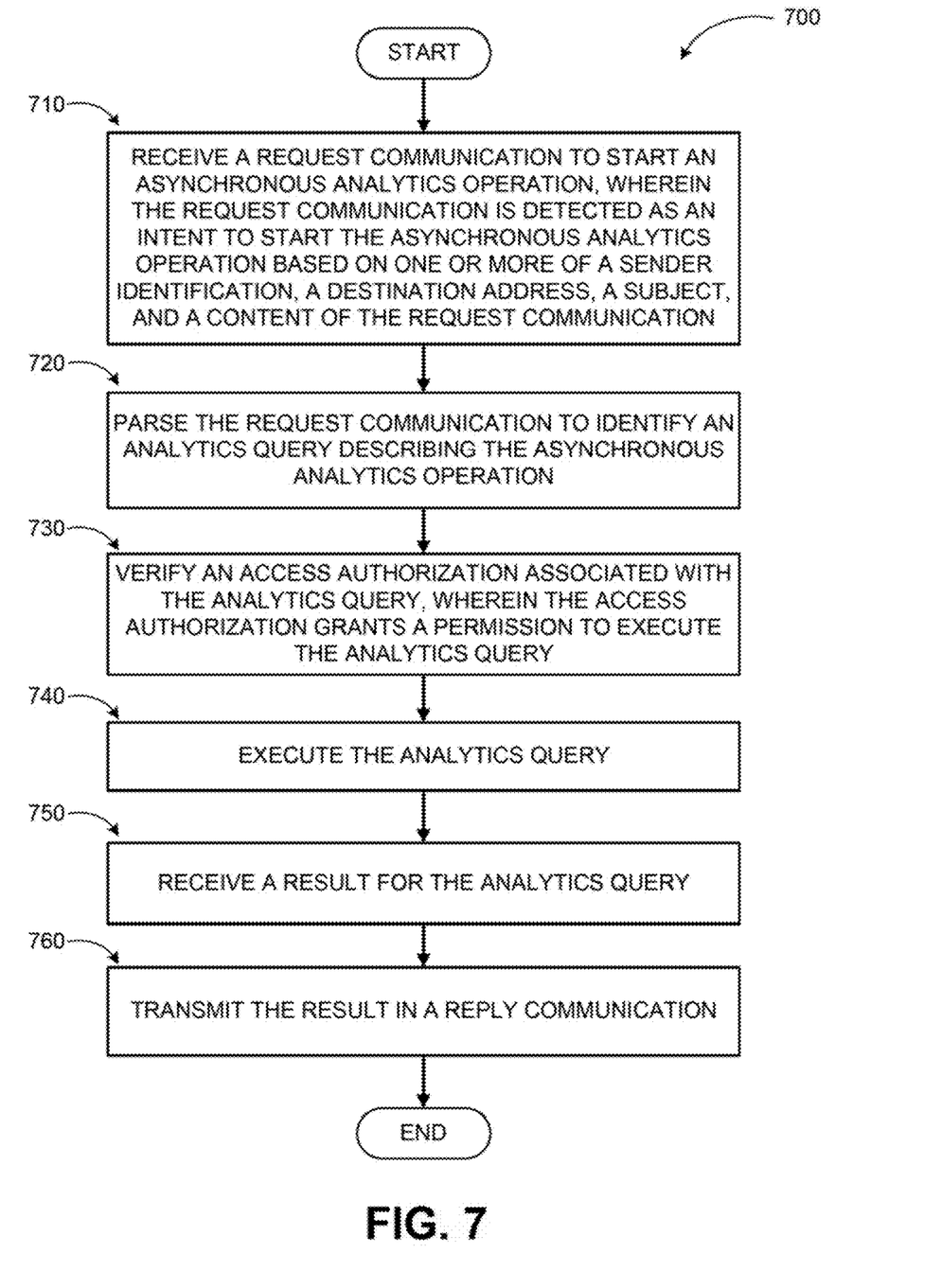
FIG. 7 is a logic flow diagram illustrating a process for managing an asynchronous analytics operation based on a communication exchange, according to embodiments.

FIG. 7 is a logic flow diagram illustrating a process for managing an asynchronous analytics operation based on a communication exchange, according to embodiments. Process 700 may be implemented on a computing device, such as the computing device 600 or another system.

Process 700 begins with operation 710, where a communication service may receive a request communication to start an asynchronous analytics operation. The request communication may be detected as an intent to start the asynchronous analytics operation based on a sender identification, a destination address, a subject, and/or a content of the request communication. The request communication may include a request email. The asynchronous analytics operation may include an analytics query to be executed on a dataset. Next, at operation 720, the communication service may parse the request communication to identify the analytics query associated with the asynchronous analytics operation. The communication service may identify the analytics query within a body of the request communication At operation 730, an access authorization associated with the analytics query may be verified. The access authorization may grant a permission to execute the analytics query. At operation 740, the analytics query may be executed. The analytics query may be executed by an analytics module (or an analytics provider) to query a dataset. At operation 750, a result for the analytics query may be received. The result may include a data record that matches the analytics query.

At operation 760, the result may be transmitted in a reply communication. The reply communication may include a reply email.

The operations included in process 700 is for illustration purposes. Managing an asynchronous analytics operation based on a communication exchange may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

According to some examples, a method executed on a computing device to manage an asynchronous analytics operation based on a communication exchange is described. The method includes parsing the request communication to identify an analytics query associated with the asynchronous analytics operation, verifying an access authorization associated with the analytics query, where the access authorization grants a permission to execute the analytics query, executing the analytics query, receiving a result for the analytics query, and transmitting the result in a reply communication.

According to other examples, the request communication includes a request email and the reply communication includes a reply email. The method further includes detecting the sender identification in the request communication and verifying the access authorization based on the sender identification. The method further includes receiving a second request communication to start a second analytics operation, detecting a second sender identification in the second request communication, and upon a failure to verify the access authorization based on the second sender identification, rejecting the second request communication.

According to further examples, executing the analytics query includes transmitting the analytics query to an analytics provider and receiving the result for the analytics query from the analytics provider. Parsing the request communication to identify the analytics query associated with the asynchronous analytics operation includes identifying the analytics query as formatted in a standardized query language within a body of the request communication.

According to other examples, the method further includes querying a status information associated with the analytics query based on a partial completion event associated with the analytics query, receiving the status information associated with the analytics query, and transmitting the status information associated with the analytics query within a status communication to a sender of the request communication. The method further includes determining a completion status of the analytics query and inserting the completion status of the analytics query as the status information into the status communication. The method further includes receiving a preliminary result for the analytics query, where the preliminary result include one or more data records from a dataset queried with the analytics query that are retrieved up to a time period associated with the partial completion event and inserting the preliminary result as the status information into the status communication.

According to further examples, the method further includes formatting the result into a report and transmitting the report in the reply communication. The report is formatted based on one or more of a historical format associated with a sender of the request communication, a format template associated with the analytics query, and a data provider based formatting.

According to some examples, a server configured to manage an asynchronous analytics operation based on a communication exchange is described. The server includes a communication device configured to facilitate communication between a communication service and one or more client devices, a memory configured to store instructions, and a processor coupled to the memory and the communication device. The processor executes the communication service in conjunction with the instructions stored in the memory. The communication service includes an analytics module and a transmission module. The analytics modules is configured to receive a request email from a sender to start the asynchronous analytics operation, parse the request email to identify an analytics query associated with the asynchronous analytics operation, provide, through the communication device, the analytics query to an analytics provider, and receive a result of the analytics query from the analytics provider. The transmission module is configured to provide, through the communication device, the result within a reply email to the sender.

According to other examples, the analytics module is further configured to estimate a time to complete the analytics query and instruct the transmission module to provide the estimated time to complete the analytics query to the sender within a status update email. The analytics module is further configured to receive a request to complete the analytics query within a time period and transmit an instruction to the analytics provider to prioritize the analytics query for a completion within the requested time period.

According to further examples, the analytics module is further configured to detect an insufficient capacity to complete the analytics query in relation to the analytics provider and partition the analytics query among one or more other analytics providers. The analytics module is further configured to verify an access authorization associated with the sender to query a dataset associated with the analytics query. The analytics module is further configured to determine the request email to include the analytics query based on a destination address of the request email.

According to some examples, a computer-readable memory device with instructions stored thereon to manage an asynchronous analytics operation based on a communication exchange. The instructions include actions that are similar to the actions provided by the server.

According to other examples, the instructions further include detecting a failure to locate a data record that matches the analytics query as the result of the analytics query and suggesting an alternative analytics query derived from the failed analytics query within the reply email. The instructions further include querying a completion status associated with the analytics query in response to a request, receiving the completion status associated with the analytics query, and transmitting the completion status associated with the analytics query within a status email to a sender of the request email.

According to some examples, a means for managing an asynchronous analytics operation based on a communication exchange is described. The means for managing an asynchronous analytics operation based on a communication exchange includes a means for receiving a request communication to start the asynchronous analytics operation, where the request communication is detected as an intent to start the asynchronous analytics operation based on one or more of a sender identification, a destination address, a subject, and a content of the request communication, a means for parsing the request communication to identify an analytics query associated with the asynchronous analytics operation, a means for verifying an access authorization associated with the analytics query, where the access authorization grants a permission to execute the analytics query, a means for executing the analytics query, a means for receiving a result for the analytics query, and a means for transmitting the result in a reply communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to manage an asynchronous analytics operation based on a communication exchange, the method comprising:
   receiving a communication;
   detecting whether the communication is a request to start the asynchronous analytics operation; and
   in response to detecting that the communication is a request to start the asynchronous analytics operation:
      parsing the communication to identify an analytics query associated with the asynchronous analytics operation;
      verifying an access authorization associated with the analytics query, wherein the access authorization grants a permission to execute the analytics query;
      executing the analytics query;
      querying a status information associated with the analytics query based on a partial completion event associated with the analytics query;
      receiving the status information associated with the analytics query;
      transmitting the status information associated with the analytics query within a status communication to a sender of the communication;
      receiving a result for the analytics query; and
      transmitting the result in a reply communication.

2. The method of claim 1, wherein the communication includes an email and the reply communication includes a reply email.

3. The method of claim 1, further comprising:
   detecting the sender identification in the communication; and
   verifying the access authorization based on the sender identification.

4. The method of claim 1, further comprising:
   receiving a second communication to start a second analytics operation;
   detecting a second sender identification in the second communication; and
   upon a failure to verify the access authorization based on the second sender identification, rejecting the second communication.

5. The method of claim 1, wherein executing the analytics query comprises:
   transmitting the analytics query to an analytics provider; and
   receiving the result for the analytics query from the analytics provider.

6. The method of claim 1, wherein parsing the communication to identify the analytics query associated with the asynchronous analytics operation comprises:
   identifying the analytics query as formatted in a standardized query language within a body of the communication.

7. The method of claim 1, further comprising:
   determining a completion status of the analytics query; and
   inserting the completion status of the analytics query as the status information into the status communication.

8. The method of claim 1, further comprising:
   receiving a preliminary result for the analytics query, wherein the preliminary result include one or more data records from a dataset queried with the analytics query that are retrieved up to a time period associated with the partial completion event; and
   inserting the preliminary result as the status information into the status communication.

9. The method of claim 1, further comprising:
   formatting the result into a report; and
   transmitting the report in the reply communication.

10. The method of claim 9, wherein the report is formatted based on one or more of a historical format associated with a sender of the communication, a format template associated with the analytics query, and a data provider based formatting.

11. A server configured to manage an asynchronous analytics operation based on a communication exchange, the server comprising:
   a communication device configured to facilitate communication between a communication service and one or more client devices;
   a memory configured to store instructions; and
   a processor coupled to the memory and the communication device, the processor executing the communication service in conjunction with the instructions stored in the memory, wherein the communication service includes:
      an analytics module and a transmission module;
      wherein the analytics module is configured to:
         receive an email from a sender;
         detecting whether the email is a request to start the asynchronous analytics operation; and
         in response to detecting that the email is a request to start the asynchronous analytics operation:
            parse the email to identify an analytics query associated with the asynchronous analytics operation;
            provide, through the communication device, the analytics query to an analytics provider;
            estimate a time to complete the analytics query;
            instruct the transmission module to provide the estimated time to complete the analytics query to the sender within a status update email; and
            receive a result of the analytics query from the analytics provider;
      and
      and the transmission module is configured to:
         provide, through the communication device, the result within a reply email to the sender.

12. The server of claim 11, wherein the analytics module is further configured to:
   receive a request to complete the analytics query within a time period; and
   transmit an instruction to the analytics provider to prioritize the analytics query for a completion within the requested time period.

13. The server of claim 11, wherein the analytics module is further configured to:

detect an insufficient capacity to complete the analytics query in relation to the analytics provider; and partition the analytics query among one or more other analytics providers.

14. The server of claim 11, wherein the analytics module is further configured to:

verify an access authorization associated with the sender to query a dataset associated with the analytics query.

15. A computer-readable memory device with instructions stored thereon to manage an asynchronous analytics operation based on a communication exchange, the instructions comprising:

receiving an email from a sender;

detecting whether the email is a request to start the asynchronous analytics operation; and in response to detecting that the email is a request to start the asynchronous analytics operation:

parsing the email to identify an analytics query associated with the asynchronous analytics operation;

providing the analytics query to an analytics provider;

querying a completion status associated with the analytics query in response to a request receiving the completion status associated with the analytics query;

transmitting the completion status associated with the analytics query within a status email to the sender of the email;

receiving a result of the analytics query from the analytics provider; and providing the result within a reply email to the sender.

16. The computer-readable memory device of claim 15, wherein the instructions further comprise:

detecting a failure to locate a data record that matches the analytics query as the result of the analytics query; and suggesting an alternative analytics query derived from the failed analytics query within the reply email.

* * * * *